United States Patent Office 3,644,301
Patented Feb. 22, 1972

3,644,301
1-METHYLCYCLOPROPENE COPOLYMERS
William S. Anderson, Oakland, Calif., assignor to Shell
Oil Company, New York, N.Y.
No Drawing. Filed Nov. 20, 1969, Ser. No. 878,590
Int. Cl. C08f *17/00*
U.S. Cl. 260—78.5 R           9 Claims

ABSTRACT OF THE DISCLOSURE

Novel copolymers of 1-methylcyclopropene useful for preparing adhesives, coatings, films, fibers and molded objects are disclosed. The copolymers are prepared by ordinary polymerization processes.

---

The invention relates to novel copolymers of 1-methylcyclopropene and their preparation. More particularly, the invention relates to new high molecular, weight copolymers of 1-methylcyclopropene, having excellent properties, enabling broad utility. 1-methylcyclopropene is a dense, highly reactive compound boiling about 10° C. It may be prepared by the dehydrohalogenation of methallyl chloride with sodamide dispersed in an inert medium, e.g. tetrahydrofuran, as described in the Journal of Organic Chemistry, 30, 2089 (1965). Minor amounts of methylene cyclopropane are also formed. It is known that unstabilized 1-methylcyclopropene changes spontaneously at room temperature into a soluble polymer, however, this homopolymer has never acquired any technical importance, chiefly because of its low molecular weight.

It has now been discovered that 1-methylcyclopropene reacts with other monomers having a copolymerization reactivity coefficient ($e$ value) above, i.e. more positive than, about −0.70 to form high molecular weight copolymers which are particularly useful and valuable in industry. It has been found that 1-methylcyclopropene may be copolymerized with one or more ethylenically unsaturated acid and anhydrides, esters, vinyl and vinylidene monomers, aldehydes, ketones having a copolymerization reaction coefficient $e$ value preferably above about −0.50 and most preferably above −0.30 to form products having a surprisingly wide range of excellent properties.

It has been found that these copolymers preferably having an intrinsic viscosity above 0.3 dl./g. have surprisingly good properties to form valuable plastic products particularly useful for the preparation of films, fibers, adhesives, coatings, moldings and the like.

The copolymerizable monomers to be used in making the new copolymers comprise monomers having copolymerization reactivity coefficient $e$ values above about −0.70, preferably above −0.50, as determined from copolymerization reactivity ratios, according to the equations in Polymer Handbook, Brandrup and Immergut, ed., New York, Interscience, 1966, on pages II–141 and II–341. Suitable copolymerizable monomers appear e.g. on pages II–344 to II–351 of the same treatise. Particularly preferred monomers are those having the aforesaid $e$ values above −0.30 containing less than about 10 carbon atoms.

The amount of 1-methylcyclopropene and copolymerizable monomer to be employed in making the new copolymers may vary within certain limits. The amount of 1-methylcyclopropene should be at least 1% by weight of the mixture and preferably not more than 99% by weight of the monomer. Copolymers having outstanding properties are obtained when the 1-methylcyclopropene varies from 1 to 99% and particularly from about 25 to 75% by weight of the copolymer.

The new copolymers of the invention may be prepared using free radical initiating catalysts by methods well known to those skilled in the art such as, e.g. bulk or solution techniques. Suitable catalysts include organic oxides, peroxides, hydroperoxides, azo compounds, etc., such as hydrogen peroxide, benzoyl peroxide, cumene hydroperoxide, di-tert-butyl peroxide, ascaridole, acetyl peroxide, trimethylamine oxide, dimethylaniline oxide, isopropylperoxydicarbonate, di-isobutylene ozonide, peracetic acid, nitrates, chlorates, perchlorates, azobisisobutyronitrile etc. Suitable concentrations are between about 0.0001 and 5% and preferably between 0.001 and by 1% by weight of the total reaction mixture. It has also been found that 1-methylcyclopropene copolymerizes spontaneously with some monomers such as maleic anhydride in the absence of any initiator.

One of the methods which may be used for polymerizing the monomers is emulsion polymerization. By this method polymerization takes place in an aqueous medium with the aid of emulsifying agents. The monomeric reactants are present almost entirely as emulsion or suspension droplets dispersed in the continuous phase.

The emulsifying agent used is not critical and may be anionic, cationic or non-ionic. However, since the aqueous phase is present usually in greater quantity than the organic phase, the use of anionic agents resulting in an oil-in-water type emulsion may be preferred. Suitable emulsifying agents which may be used include such materials as the fatty acids and their soaps including substituted derivatives of the fatty acids and rosin acids, sulfuric esters including salts of sulfated fatty oils and alcohols, alkane sulfonates, alkarylsulfonates, mahogony and petroleum sulfonates, as well as phosphorus containing emulsifying agents. Some specific examples include the alkali metal salts of $C_{12}$ to $C_{18}$ straight-chain carboxylic acids, i.e., sodium stearte, sodium oleate, and mixtures thereof, of acids obtained from tallow, coconut oil, palm oil, etc., tall oil acid soaps, sodium lauryl sulfate, sodium dodecyl benzene sulfonate, sodium di(2-ethylhexyl)orthophosphate and the like. Any amount of emulsifying or suspending agent may be used which will provide at least a relatively stable emulsion or suspension of the polymerization ingredients. Generally, from about 0.5 to about 10% by weight of emulsifying agent is sufficient.

The copolymers may also be prepared by polymerizing the monomers in bulk without the addition of other diluents. Alternatively, solution polymerization in the presence of inert hydrocarbon diluents such as butane, pentane, hexane, cyclohexane, offers the advantage of removing heat of polymerization as well as maintaining the polymer in solution. Other suitable polymerization techniques may also be used.

The monomers to be polymerized may be added altogether at the beginning of the reaction or one or more monomers may be added in large amounts or in incremental proportions during the course of the reaction. If there is considerable difference in the rate of polymerization of the monomers, it is preferred to add the monomer which is consumed the fastest in small increments during the course of the polymerization reaction.

The temperature employed in the process may vary over a considerable range. It is generally preferred to employ relatively low temperatures. In general, temperatures will vary from about −70° C. to about 150° C. Preferred temperatures range from about −20° C. to 50° C. Atmospheric, super-atmospheric or subatmospheric pressures may be utilized as desired.

The polymerization is preferably effected in an inert atmosphere. This may be preferably accomplished by passing inert gases, such as nitrogen, methane, etc., into and through the reaction mixture. It is also preferred to distill the monomers under nitrogen before use in the process.

The process may be conducted batchwise or in a semicontinuous or continuous scale.

The copolymers precipitate from the monomers or by the addition of an appropriate solvent such as e.g. methanol and may be recovered by any suitable means, such as filtration, centrifugation and the like.

The new copolymers can also be prepared by exposing a mixture of the monomers alone in solution or in an aqueous system to high energy ionizing radiation. If conducted in an aqueous system the medium can contain any of the above-described anti-coalescent agents, emulsifying agents, stabilizing materials and the like. Various other materials, such radiation accelerators as halides, metal salts and the like, may be added to the reaction mixture.

The radiation polymerization is preferably conducted in an inert atmosphere. This may be accomplished by the use of high vacuum or by the use of an inert atmosphere, such as an atmosphere of nitrogen, methane, ethane and the like.

The temperature employed during the radiation polymerization may vary over a considerable range. In general, temperatures range from about $-100°$ C. to $100°$ C. and more preferably from $10°$ C. to $80°$ C. With acrolein as a comonomer, preferred temperatures range from $0°$ C. to about $50°$ C.

The kind of radiation suitable for use in the present invention include ultraviolet or high energy electrons, protons and photons.

The total dosage employed may vary over a wide range. Preferred total dosage varies from about $10^5$ to $5 \times 10^6$ rads; dosages of up to $5 \times 10^7$ rads or more, calculated on the total mixture, may be employed if polymer is removed from the irradiation zone after it is formed.

The dosage rate will also vary. Preferred dosage rates vary from about $10^4$ to $10^{12}$ rads per hour, and still more preferably $10^5$ to $10^{10}$ rads per hour.

The polymer found in liquid reaction mixtures will precipitate out as a solid from the reaction mixture or from an appropriate solvent, such as methanol; and may be recovered by any suitable means, such as filtration, centrifugation and the like.

The high molecular weight copolymers are substantially white solids preferably having intrinsic viscosities of at least 0.3 and most preferably 0.5 to 5.0 dl./g.

The above described copolymers have a wide variety of plastic properties depending upon the one or more comonomers polymerized therewith. Some copolymers, employing e.g. acrylic acid are hard, glass thermosets suitable for laminatings, coatings, pottings and the like. Copolymers such as derived from, e.g. maleic anhydride are brittle preferentially solvent soluble resins suitable for adhesives, coatings castings and the like. Many of the copolymers, employing vinyl monomers, e.g. dialkyl fumarates and acrylonitrile, are thermoplastics and may be molded at high temperature to form plastic articles. Temperatures used in molding may vary from about $90°$ C. to $300°$ C., and preferentially between $100°$ C. and $250°$ C. Pressures employed in molding may vary from about 3,000 p.s.i. to about 25,000 p.s.i. These moldings are usually transparent and can be used for a variety of plastic products such as toys, combs, pencils. The 1-methylcyclopropene copolymers have broad utility resulting from generally high glass transition temperatures, making them particularly suitable for household utensils resistant to boiling water, molded plastic parts for automobile interiors and so forth. Additionally, copolymers retaining the cyclopropane rings intact and having at least 10 monomer units may be used as starting materials for the production of lube oil additives, diverse synthetic resins and as basic polymers for the synthesis of graft copolymers.

The following examples are given to illustrate the invention. It is to be understood, however, that the examples are for the purpose of illustration and the invention is not to be regarded as limited to any specific materials or conditions recited therein. Unless indicated, parts are by weight.

EXAMPLE I

This example illustrates the preparation of a heat curable copolymer of 1-methylcyclopropene and acrylic acid and its use as an adhesive.

To a glass reaction vessel are added the following components: 170 parts of acrylic acid and 150 parts of 1-methylcyclopropene (containing about 20% methylene cyclopropane impurity) and 1 part diethyl percarbonate initiator. The above reaction mixture is agitated at $5°$ C. overnight resulting in about 90% conversion. The unreacted monomer comprises chiefly the methylene cyclopropane impurity. The resulting polymer contains about 50% by weight of gel. The sol portion was separated by filtration and precipitated by methanol. The resulting product was identified as a copolymer containing 50% 1-methylcyclopropene and 50% by weight ef acrylic acid and had an intrinsic viscosity of 1.8 dl./g. in tetrahydrofuran at $25°$ C. The polymer was soluble in tetrahydrofuran and aqueous sodium carbonate, but is insoluble in acetone or water.

The copolymer was a hard clear glass at room temperature. It was pressed at $140°$ C. to clear films which are cured by heating 5 hours at $190°$ C. There is little density change during the cure step.

When deposited from tetrahydrofuran solution the copolymer adhered tightly to stainless steel and glass. Etched aluminum pieces coated with the copolymer were pressed together at 30,000 p.s.i. and $200°$ C. for one hour. The resulting lap joint had a shear strength of 2,820 p.s.i. with the break occurring within the adhesive, not at the metal-adhesive interface.

The copolymer was hard and not easily molded.

EXAMPLE II

Example I was repeated with the exception that in place of the acrylic acid, methacrylic acid was employed in an amount of 150 parts and the 1-methylcyclopropene was employed in the amount of 120 parts. Related results are obtained, except the product was gel-free.

EXAMPLE III

Example II is repeated with the exception that methacrylic acid is replaced with fumaric acid, and monoethyl fumarate respectively. The resulting copolymers have somewhat weaker adhesive strength toward glass and metal.

EXAMPLE IV

This example illustrates the preparation of copolymers of 1-methylcyclopropene with acrylonitrile and used thereof as thermoplastic molding compositions, films and adhesives.

To a glass reactor were added the following components: 800 parts acrylonitrile, 20 parts azoisobutyronitrile, and 810 parts of a mixture containing 1-methylcyclopropene and methylene cyclopropane in equimolar amounts. The mixture was agitated at $15°$ C. while being exposed to ultarviolet light for three hours. The methylene cyclopropane is considerably less reactive than the methylcyclopropene and was chiefly recovered at the end of the polymerization. The polymeric product precipitated from the monomers as a water while transparent powder, having an intrinsic viscosity of 1.2 dl./g. in chloroform at $25°$ C., which could be molded at $150°$ C. and 30,000 p.s.i. to a clear casting having a hardness of 86 (Rockwell M) and a glass transition temperature of $135°$ C.

Copolymer coatings have excellent low temperature adhesion to high energy surfaces such as glass and metals. Glassware coated wtih the polymer breaks when cooled to −78° C. owing to the strength of the polymer to glass bond and unequal thermal contraction in the two materials. To test mechanical properties, the copolymer was molded into a dumbbell of 0.050 inch thick, 0.125 in width and 0.050 inch gage length stretched at 0.2 in./minute at 23° C. A surprising combination of a yield point of 12,300 p.s.i. was found, together with an elongation at break of 26%. Clear flexible films were pressed at 150° C.

EXAMPLE V

To a glass reactor were added the following: 100 parts of acrylonitrile emulsified in 1000 parts of water containing 1 part of sodium lauryl sulfate (emulsifier), 10 parts of diethyl peroxydicarbonate and 100 parts of 1-methylcyclopropene mixture containing approximately 20 parts methylene cyclopropane impurity. The mixture was agitated at 5° C. for about 50 hours. The emulsion was coagulated by freezing and thawing resulting in fibrous polymer structure about 50 mm. long.

EXAMPLE VI

To a glass reactor were added the following: 140 parts of methacrylonitrile, 2 parts of diethylperoxydicarbonate and 120 parts of 1-methylcyclopropene containing about 20% methylenecyclopropane impurity. The mixture was agitated at about 5° C. for 92 hours. The resulting copolymer contained about 49% by weight acrylonitrile and had an intrinsic viscosity of 0.3 dl./g. in $CHCl_3$. The hard, brittle polymer had a glass transition temperature of 139° C.

EXAMPLE VII

This example illustrates the preparation of a copolymer of methylcyclopropene and acrylonitrile in the absence of a radial initiator.

To a glass reaction vessel were added the following: 180 parts of acrylonitrile and 100 parts of methylcyclopropene containing about 5% methylene cyclopropane. The mixture was agitated at 50° C. for 43 hours. The resulting oily copolymer, which had an acrylonitrile content of 11% by weight, contained both reactive cyclopropane rings and cyano groups. Accordingly it is useful starting material for production of diverse synthetic resins and as a basic polymer for synthesis of graft copolymers.

EXAMPLE VIII

This example illustrates the preparation of a copolymer of methyl cyclopropene and maleic anhydride in the absence of a radical initiator.

To a glass reaction vessel were added the following: 200 parts of maleic anhydride, 1000 parts of diethylether and 110 parts of 1-methylcyclopropene containing about 9% methylene cyclopropane impurity. The mixture was agitated at 25° C. for 18 hours resulting in precipitation of a white powder of copolymer having an intrinsic viscosity of 0.8 dl./g. in acetone. The polymer was soluble in acetone and pyridine, but insoluble in chloroform, hydrocarbons or water. A solution of the polymer was cast into a film which upon evaporation of the solvent formed a rigid glass softening near 300° C. without discoloration.

EXAMPLE IX

To a glass reactor is added the following: 340 parts parts of diethyl fumarate, 2500 parts of t-butanol solvent, 2.5 parts of diethyl percarbonate (initiator) and 140 parts of 1-methylcyclopropene containing about 13% methylene cyclopropane impurity. The mixture was agitated at 5° C. for 65 hours. The resulting copolymer had an alternating one to one monomer configuration with the ring intact as determined from a combination of elemental analysis, infra-red analysis (3.25 and 25.4 microns) and absence of olefinic protons by nuclear magnetic resonance. The resulting copolymer had an intrinsic viscosity of 1.06 dl./g. in tetrahydrofuran at 25° C. Mechanical properties of the copolymer included a tensile strength of 5,400 p.s.i., elongation at break of 64% and an Izod impact strength of 3.6 ft. lbs./in. of notch. Clear, colorless, void-free moldings were obtained at 140° C.

EXAMPLE X

To a glass reactor is added the following: 400 parts of vinyl chloride, 5 parts of diethyl percarbonate and 20 parts of methylcyclopropene containing about 18% methylene-cyclopropane impurity. The mixture was agitated at 0° C. for 68 hours. The resulting copolymer which contained about 82% of vinyl chloride had an intrinsic viscosity of 0.9 dl./g. in chloroform. A sample of the copolymer containing 2% by weight dibutyltindilaurate was molded at 95° C.

EXAMPLE XI

The procedure of Example X is repeated employing vinylidene chloride and vinyl acetate, respectively, in place of the vinyl chloride. Related results are obtained.

EXAMPLE XII

These next two examples illustrate that 1-methylcyclopropene can be copolymerized with more than one comonomer to alter or improve properties such as, e.g., moldability. To a glass reactor is added the following: 360 parts of acrylic acid, 500 parts of acrylonitrile, 3,000 parts of tetrahydrofuran and 30 parts of diethyl peroxydicarbonate initiator and 340 parts of 1-methylcyclopropene containing 18% methylenecyclopropane. The mixture was agitated at 5° C. for 66 hours. The resulting copolymer had an intrinsic viscosity of 0.3 dl./g. in tetrahydrofuran and contained about 30% by weight acrylonitrile. The copolymer was easily molded when compared to the copolymer of Example I without acrylonitrile. This copolymer also adheres well to metals. The adhesion test with aluminum of Example I was repeated using the copolymer which was cured for 3 hours at 200° C., resulting in a lap joint shear strength of 2900 p.s.i.

EXAMPLE XIII

The above procedure is repeated except that only 260 parts of acrylonitrile is used, an additional component 500 parts of ethyl acrylate is added, and a large amount of initiator i.e. 60 parts of diethyl peroxydicarbonate is employed. After 115 hours of agitated reaction at 5° C., the resulting polymer of the four monomers had an intrinsic viscosity of 0.4 dl./g. in tetrahydrofuran. Cyclopropane bands were detected in the infrared spectrum at 3.28 and 9.65 microns. The copolymer which contained about 20% acrylonitrile was still more easily moldable than the copolymer of Example XII.

I claim as my invention:

1. A copolymer consisting of 1-methylcyclopropene with one or more ethylenically unsaturated comonomer having a copolymerization reactivity coefficient more positive than −0.70, wherein the copolymer contains one or more acrylic monomer, said copolymer having more than 10 monomer units., 2. A copolymer consisting of 1-methylcyclopropene with at least one ethylenically unsaturated comonomer having a copolymerization reactivity coefficient more positive than −0.70, wherein the copolymer contains one or more comonomer from the group consisting of an unsaturated acid, unsaturated acid anhydride, unsaturated nitrile, unsaturated ester, and unsaturated halide; said copolymer having more than 10 monomer units.

3. A high molecular copolymer consisting of 1-methylcyclopropene with one or more ethylenically unsaturated comonomer having a copolymerization reactivity coefficient more positive than −0.70, said copolymer having an intrinsic viscosity of at least 0.3 dl./g.

4. A copolymer as in claim 3 where the 1-methylcyclopropene makes up from 1 to about 99% of the copolymer.

5. A copolymer as in claim 3 wherein the copolymer contains at least one vinyl monomer.

6. A copolymer as in claim 3 wherein said comonomer has a copolymerization reactivity coefficient more positive than −0.50.

7. A copolymer as in claim 3 wherein said comonomer has a copolymerization reactivity coefficient more positive than −0.30 and not more than 10 carbon atoms.

8. A copolymer consisting of 1-methylcyclopropene with one or more ethylenically unsaturated comonomer having a copolymerization reactivity coefficient more positive than −0.70, wherein one or more comonomer is an alkyl ester of an unsaturated acid, said copolymer having more than 10 monomeric units.

9. A copolymer as in claim 9 wherein one or more comonomer is an unsaturated hydrocarbon.

References Cited
UNITED STATES PATENTS

| | | | |
|---|---|---|---|
| 3,413,275 | 11/1968 | Barkdoll | 260—87.7 |
| 3,502,631 | 3/1970 | Anderson | 260—93.1 |

OTHER REFERENCES

Fisher, F., et al., J. Org. Chem., 30, 2089 (1965).
Iwatsuki, S., et al., J. Polym. Sci., Pt. A–1, 6, p. 2441 (1968).

JOSEPH L. SCHOFER, Primary Examiner

C. A. HENDERSON, Jr., Assistant Examiner

U.S. Cl. X.R.

117—122 PA, 123 D, 132; 156—327; 204—159.22; 252—9; 260—30.4 R, 45.75 K, 63 R, 67 UA, 78.5 HC, 80.8, 80.81, 85.5 HC, 87.5 C, 87.7, 88.1 PC